Sept. 21, 1971   J. L. CHAZEN   3,606,809
METHOD OF CONVERTING JUNKED VEHICLES TO REUSABLE SCRAP METAL
Original Filed Nov. 14, 1966
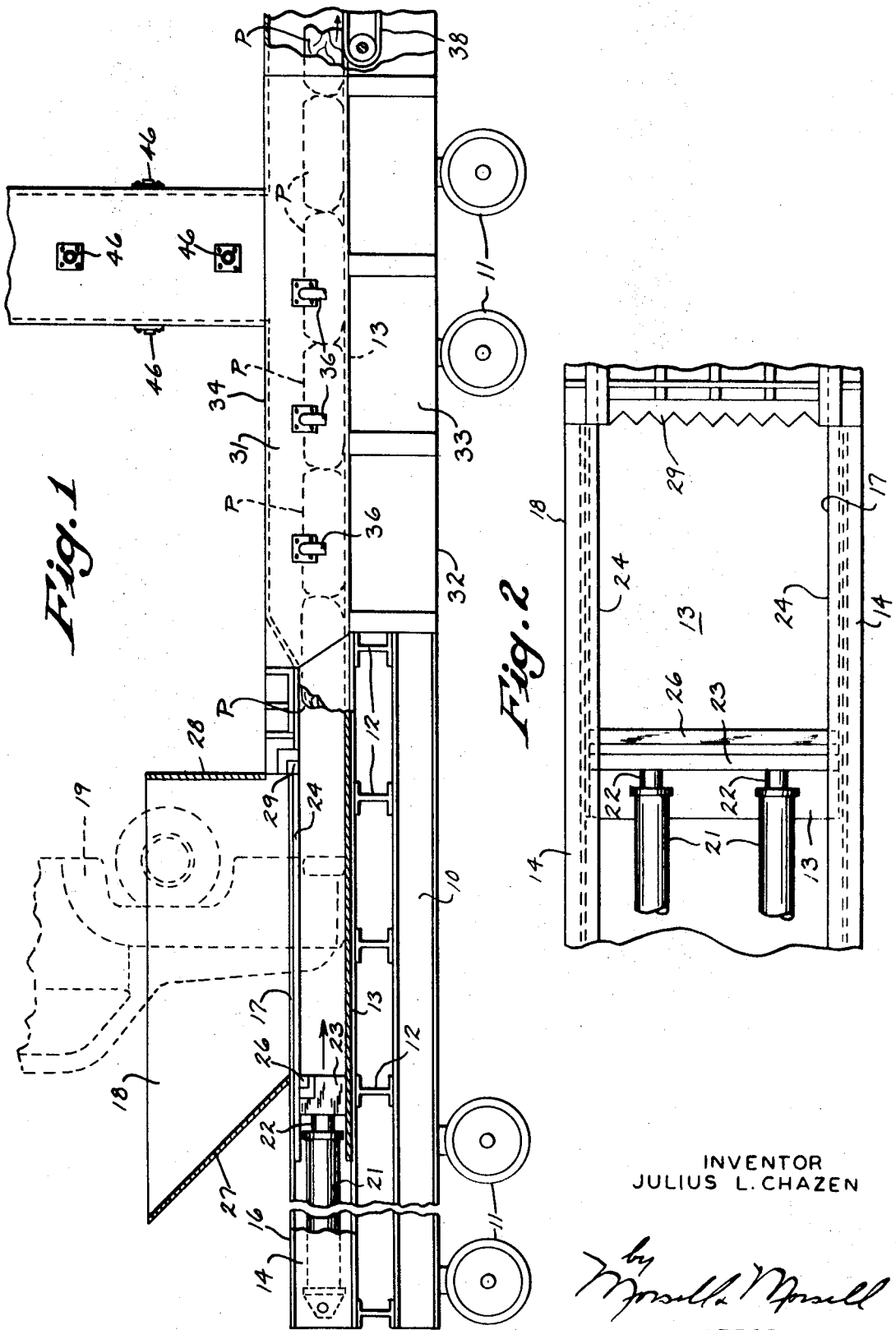
INVENTOR
JULIUS L. CHAZEN
ATTORNEYS

United States Patent Office 3,606,809
Patented Sept. 21, 1971

3,606,809
METHOD OF CONVERTING JUNKED VEHICLES TO REUSABLE SCRAP METAL
Julius L. Chazen, % SMC Industries, Inc., Chattanooga, Tenn. 37401
Original application Nov. 14, 1966, Ser. No. 594,203, now Patent No. 3,518,078, dated June 30, 1970. Divided and this application Sept. 22, 1969, Ser. No. 859,774
Int. Cl. B30b 9/00
U.S. Cl. 83—23       5 Claims

ABSTRACT OF THE DISCLOSURE

A method in which junked items such as automobiles are supported endwise in upright position and in which a ram-type shear is moved back and forth transversely of the lower portion of the supported article to shear off similarly sized portions thereof, one after another, while advancing each portion out of the way during the shearing stroke and while causing the junked item to be fed in a downwardly direction to present successive lower portions to the shearing stroke.

---

This application is a division of application S.N. 594,-203, filed Nov. 14, 1966, now Pat. No. 3,518,078, dated June 30, 1970.

Heretofore the largest source of scrap metal has been baled automobile bodies, in which there is necessarily a large amount of contaminants such as wood, rubber, aluminum, plastic, fabrics, and other materials besides steel. Attempt to burn automobile bodies prior to baling has only partially reduced the percentage of contaminants. As a result, scrap metal from automobile bodies is presently rated only as No. 2 scrap material, and is in increasingly less favor with the steel mills because of certain conditions which make it highly desirable to use higher grade scrap.

Heretofore various other methods have been proposed for preparing scrap metal from automobile bodies, such as the use of a hammer mill. However, a hammer mill of sufficient size is extremely expensive so that wide usage of this method has not resulted. Furthermore, there is still the problem of separating the contaminants. In accordance with the present invention it is proposed to provide means for shearing the automobile into smaller portions of a size where the contaminants are more thoroughly exposed, and to then provide for incineration of these portions before further processing of the sheared portions.

With the above considerations in mind, the principal object of the invention is to provide an improved method which includes the steps of progressively shearing a vehicle into smaller portions, and continuously causing the shearing instrument to advance said sheared portions, one after another.

A further object of the invention is to provide an improved method wherein the shearing ram is caused to perform the dual function of shearing off the vehicle portion and of causing advance of sheared portions toward an incinerating zone or a place of discharge.

A further object of the invention is to provide an improved method for reducing junked automobiles or other vehicles to scrap metal, as described, which novel method may be carried out by mobile apparatus to permit a scrap car dealer to utilize the same on his lot without necessitating the transporting of said junked vehicles, thereby facilitating the use of said method with balers and other stationary processing equipment.

Still further objects of the present invention are to provide a novel method for the purpose described which is relatively simple and inexpensive in design, which is reliable in operation, and which is otherwise particularly well suited for its intended purposes.

With the above and other objects in view, which other objects and advantages will become apparent hereinafter, the invention comprises the novel and improved method described in the following specification and also any and all modifications or variations thereof as may come within the spirit of said invention, and within the scope of the appended claims.

In the accompanying drawing wherein there is shown one preferred embodiment of the apparatus which may be used to carry out the present invention, and wherein the same reference numerals designate the same parts in both of the views:

FIG. 1 is a side elevational view of the apparatus with parts thereof broken away and shown in section; and FIG. 2 is a fragmentary top plan view showing the coacting shear elements employed in said apparatus.

Referring now more particularly to FIG. 1 of the drawing, the numeral 10 designates an elongated horizontal subframe, and the numeral 11 indicates a plurality of supporting wheels spaced along the length of said frame, said wheels permitting the structure to be moved about as desired. As hereinabove mentioned, mobility of the apparatus utilized in the present invention is one of the important advantages inasmuch as it permits a scrap car dealer to conveniently utilize the same on his lot without requiring the prior transporting of the junked vehicles, the latter being difficult and time-consuming. In addition, and as will be hereinafter described in greater detail, the maneuverability and mobility of said device facilitates its use in conjunction with balers and other conventional scrap metal processing equipment.

Supported on and above said lower framework 10 by means of transverse I-beams 12 or other suitable supports is a floor element or bed 13, and extending upwardly on the opposite sides thereof are vertical side walls 14, there being a top or cover member 16 extending between said side walls to form an enclosed chamber. An opening 17 is provided in the top 16, and connected therewith is a loading hopper 18 communicating with the interior of said chamber. Said hopper has an inclined rearward wall 27 and a forward wall 28, and is of a size to receive an automobile 19 or other vehicle when the latter is lowered endwise therein by means of a crane or the like, as shown in broken lines in FIG. 1.

Suitably supported in a location between the side walls 14, rearwardly of the hopper 18, is a pair of parallel hydraulic cylinders 21 having extensible rams 22 (FIG. 2), there being suitable fluid lines and controls (not shown) therefor, and carried on the outer ends of said rams is a ram head 23 which is movable longitudinally of said walls 14 and is designed to ride in guideways 24 supported on the bed floor 13. Mounted within and along the upper forward portion of said ram head 23, and forming the leading upper edge thereof, is a straight, horizontal shear blade 26. Said blade 26 is positioned behind the hopper opening 17 when the hydraulic rams 22 are in their retracted position, as shown in FIG. 1, and said rams and blade have a travel distance greater than the length of said hopper opening when said rams are fully extended, as will be described. While it is preferred to use a pair of said extensible hydraulic cylinder and ram units 21, 22, it is to be understood that any desired number of said units could be employed.

Mounted adjacent and forming the forward margin of the hopper opening 17 is a serrated, fixed, horizontal shear blade 29 which spans the side walls 14, and which serrated blade is designed to coact with the blade 26 carried by the movable ram head 23 to shear off a portion of a vehicle inserted into the loading hopper 18, as will be more fully described hereinafter.

Forwardly of the hopper wall 28 the apparatus used for the present invention may include an incinerator 31 which is formed as a continuation of the hopper and shear unit, and which incinerator is designed to receive sheared portions of a vehicle from said hopper. Said incinerator includes a bottom 32, side walls 33, and top 34, and the aforementioned bed floor 13 underlying the hopper also extends the length of said incinerator. Mounted in the incinerator side walls 33 are a plurality of burners 36 connected to a suitable source of gas or other fuel, and projecting from the top of said incinerator is an exhaust stack 37 which is provided with air openings 46. Suitable burner and temperature controls may be conveniently located on said incinerator. As will be seen in FIG. 1, an endless conveyor 38 is mounted immediately adjacent the discharge end of said incinerator in alignment with the bed 13, and suitable power means (not shown) are provided for driving said conveyor.

In the operation of the illustrated apparatus for carrying out the improved method, a junked automobile 19 or other vehicle is suspended endwise over the loading hopper 18 by means of a crane or the like and is lowered into said hopper until the lower end of said vehicle rests upon the bed 13. The hydraulic cylinders 21 are then actuated to extend the rams 22 and as said rams move forwardly to an extended position the shear blade 26 carried by the ram head 23 engages against said vehicle 19. When said blade 26 approaches the forward or discharge end of the hopper it coacts with the serrated blade 29 to shear off that portion of the vehicle which is therebelow.

In accordance with the present invention, and as hereinabove described, the hydraulic rams 22 have a travel length greater than the length of the hopper opening 17, and as the ram head 23 passes beneath the shearing edge of said hopper it functions to push the sheared vehicle portion P and cause it to progress toward a point of discharge or toward the incinerator 31, where the burners 36 begin consuming any non-metallic combustibles in said vehicle portion.

The hydraulic ram 22 are then retracted to the position shown in FIGS. 1 and 2 to allow the vehicle 19 to again descend to a position wherein its lower end rests on the bed 13, and said rams are then extended again to shear off another portion P of said vehicle. As said vehicle portion P is pushed toward the incinerator 31 by the ram head 23 it engages the previously-sheared portion P and pushes the latter further into said incinerator. Said operation is repeated as the vehicle is progressively lowered into the hopper 18, and as each succeeding sheared portion P is introduced into the incinerator it functions to advance the previously-sheared portions to provide a continuous progression of said vehicle portions through said incinerator. Thus it will be seen that in the apparatus employed in carrying out the present invention the hydraulically-actuated ram head and blade unit 23, 26 performs the dual function of shearing off portions of a vehicle and simultaneously continuously urging said sheared vehicle portions toward discharge or through the adjacent incinerator toward its discharge end. The repeated intermittent operation of the hydraulic rams 22 can be automatically timed and controlled.

The incinerator 31 is of such length as to ensure that all of the upholstery, rubber, and other combustibles in the vehicle portion will be effectively incinerated by the time the sheared portion reaches the discharge end of said incinerator, and the B.t.u. output of the burners 36 and timing of the action of the rams 22 can be easily adjusted and set to promote a sufficiently effective removal of said non-metallic materials so that the quality of the scrap is substantially upgraded.

As each succeeding sheared metal portion P completes its travel through the incinerator 31 and reaches the discharge end it is pushed by the following sheared portion P onto the endless conveyor 38 which is designed to deliver said sheared and incinerated portions to a storage location or to a baler or other device for further processing. As hereinabove mentioned, the mounting of the present apparatus on wheels permits it to be conveniently used by a scrap automobile dealer or the like right on his lot, thereby eliminating the difficult task of transporting the junked vehicles to the site of the processing equipment, and it also facilitates the positioning of said apparatus relative to the baler or shredder, or other processing equipment to be used in conjunction therewith.

From the foregoing detailed description it will be seen that the present invention provides a new and improved method for reducing junked automobiles or other vehicles to re-usable scrap metal which has a number of advantages over the methods heretofore used. With the present invention there is provided a continuous, uninterrupted operation whereby a vehicle is progressively sheared into relatively small, easily-handled portions, wherein said sheared portions may be automatically continuously advanced through an incinerator interconnected to said shear unit to burn up the non-metallic materials therein, and wherein said sheared and incinerated vehicle portions are automatically continuously delivered to a baler or other desired processing equipment, or to a storage location. Said continuous processing method is more efficient and substantially less expensive than the methods heretofore employed.

It is to be understood that numerous modifications or variations in the method hereinabove described are possible and the method may be used in connection with large items other than vehicles. It is intended to include herein not only the form of the invention described in the foregoing specification, and illustrated in the drawing, but also any and all variations, modifications or adaptations thereof as may come within the spirit of said invention and within the scope of the following claims.

I claim:

1. In a method of handling junked automobiles, the steps of supporting a junked automobile body endwise in upright position, and moving a ram-type shear back and forth transversely of the lower portion of said supported automobile to shear off similarly sized portions thereof one after another while advancing each portion out of the way during the shearing stroke and while causing the junked automobile to be fed in a downward direction to present successive lower portions to the shear.

2. In a method of handling unitary junked items, the steps of supporting a unitary junked item in upright position, and moving a ram-type shear back and forth transversely of said supported item to shear off similarly sized portions thereof, one after another, while causing the shearing stroke to advance each portion out of the way during the shearing stroke and while causing the junked item to be fed toward the shear to present successive portions thereto, which includes the step of causing each sheared portion to advance the preceding sheared portion.

3. In a method of handling unitary junked items, the steps of supporting a unitary junked item in upright position, and moving a ram-type shear back and forth transversely of said supported item to shear off similarly sized portions thereof, one after another, while causing the shearing stroke to advance each portion out of the way during the shearing stroke and while causing the junked item to be fed toward the shear to present successive portions thereto, in which the shear is moved transversely of the lower portion of the supported item and in which the junked item is an elongated item and is supported endwise in upright position.

4. In a method of handling unitary junked items, the steps of supporting a unitary junked item in upright position, and moving a ram-type shear back and forth transversely of said supported item to shear off similarly sized portions thereof, one after another, while causing the shearing stroke to advance each portion out of the way during the shearing stroke and while causing the junked item to be fed toward the shear to present successive portions thereto, in which the junked item is an automobile body.

5. A method of handling unitary junked items as claimed in claim 4 in which the automobile is supported endwise in upright position, and in which the movement of the ram-type shear is in a substantially horizontal path transversely of the lower portion of the automobile body.

References Cited

UNITED STATES PATENTS

| | | | |
|---|---|---|---|
| 2,105,215 | 1/1938 | Dinzel | 83—569 |
| 3,049,274 | 8/1962 | Mosley | 100—97UX |
| 3,320,051 | 5/1967 | Lieberman | 75—44X |

FOREIGN PATENTS

| | | | |
|---|---|---|---|
| 998,428 | 7/1965 | Great Britain | 100—98 |

WILLIAM S. LAWSON, Primary Examiner

U.S. Cl. X.R.

83—42, 566, 923; 100—97